US005511725A

United States Patent [19]

Barker et al.

[11] Patent Number: 5,511,725

[45] Date of Patent: Apr. 30, 1996

[54] METHOD AND NOZZLE FOR SUPPLYING PASTE FUEL TO A FLUIDIZED BED

[75] Inventors: Stephen N. Barker, Stevenson, Great Britain; Thomas Wallin, Hallstahammar, Sweden

[73] Assignee: ABB Carbon AB, Sweden

[21] Appl. No.: 211,010

[22] PCT Filed: Sep. 25, 1992

[86] PCT No.: PCT/SE92/00665

§ 371 Date: Mar. 17, 1994

§ 102(e) Date: Mar. 17, 1994

[87] PCT Pub. No.: WO93/06417

PCT Pub. Date: Jan. 4, 1993

[30] Foreign Application Priority Data

Sep. 27, 1991 [SE] Sweden .................................. 9102828

[51] Int. Cl.$^6$ .............................. F23C 11/02; F23K 5/00; B01J 4/00; F27B 15/08

[52] U.S. Cl. ............................ 239/8; 239/424; 239/434.5

[58] Field of Search .............................. 239/416.4, 416.5, 239/417.3, 418, 419, 423, 424, 433, 434.5, 8

[56] References Cited

U.S. PATENT DOCUMENTS

| | | | |
|---|---|---|---|
| 3,050,262 | 8/1962 | Curtis | 239/424 |
| 3,896,996 | 7/1975 | Roest et al. | 239/424 |
| 4,284,242 | 8/1981 | Randell | 239/422 |
| 4,292,022 | 9/1981 | Hosek | 239/424 |
| 4,361,285 | 11/1982 | Koppehele et al. | 239/424 |
| 4,544,095 | 10/1985 | Litzen | 239/424 |
| 4,592,506 | 1/1986 | Capes et al. | 239/424 |

FOREIGN PATENT DOCUMENTS 0182545 5/1986 European Pat. Off. .

*Primary Examiner*—Karen B. Merritt
*Attorney, Agent, or Firm*—Herbert W. Larson

[57] ABSTRACT

The nozzle contains a conduit for supply of paste fuel. A tapering end of the conduit is located towards an outlet for the nozzle. A spout for supplying splitting air is directed towards the outlet for the nozzle. The jet of splitting air is imparted by the spout in the shape of a cone which has an outer edge tangent to an inner edge of the outlet for the nozzle.

8 Claims, 3 Drawing Sheets

10A 26 37 21 27 35' 24 31' 22 38 40 34 α 18 32 39 15 33

METHOD AND NOZZLE FOR SUPPLYING PASTE FUEL TO A FLUIDIZED BED

BACKGROUND OF THE INVENTION

The invention relates to method and nozzle for supplying paste fuel to a fluidized bed.

More particularly, the invention relates to a method in comminuting paste fuel which is supplied from a nozzle to a fluidized bed, wherein the fuel in the nozzle is being pressed against an end surface tapering towards the nozzle outlet, and is distributed by means of a jet of splitting air ejected from the nozzle centrally of the fuel flow upstream of the nozzle outlet. EP-A-0182545 discloses a slurry atomizer operating in this way.

In order to secure a satisfactory combustion in furnaces with fluidized bed the paste fuel is dispersed in this way in the combustion chamber as coarse droplets. This dispersion is achieved by means of the jet of splitting air which is called the primary splitting air jet and is directed towards a ceramic cone which forms said tapering end surface. The primary splitting air jet is supplemented by a secondary splitting air jet which is supplied from an annular slot around the nozzle outlet. Experience has shown that there may arise problems by the annular slot being partly clogged, which causes a non-uniformly distributed flow of secondary splitting air and trickle of fuel caused thereby as well as erosion of that part of the nozzle which defines the annular slot, due to generation of vortexes in front of the nozzle. Furthermore, the cooling of the ceramic cone will be unsatisfactory or uneven, which contributes to formation of thermal tension in the ceramic cone and cracks, caused by such tension. If the ceramic cone is replaced by a cone of softer material such as metal the cone will, however, rapidly be destroyed by erosion.

Trickle of the fuel causes formation of agglomerates which fall to the bottom of the combustion chamber and will be sintered there. In prior art nozzles, the distribution of the droplet size is moreover rather wide and the formation of droplets is disturbed by said clogging of the annular slot for secondary splitting air. The nozzles used today are sensitive as far as the strength is concerned and cannot stand today's demand of low flow of splitting air.

SUMMARY OF THE INVENTION

The related problems will be avoided by the method of the invention, including the shape of the air forming a cone tangent to the nozzle outlet.

The advantage of the invention is, above all, that the nozzle can be of a relatively simple construction and that there is obtained a narrow droplet size distribution and low trickle. By the flow of splitting air being changed, the droplet size distribution can be affected in order to obtain a major or minor proportion of fine droplets in relation to a normal distribution. Moreover, wear and clogging inside the fuel nozzle will be avoided and the tendency of forming agglomerates will be eliminated not the least due to the fact that a slot for secondary flow of splitting air no longer will be required because such flow can be dispensed with, which means a reduction of the splitting air consumption.

The nozzle for supply of paste fuel to a fluidized bed, the paste fuel being comminuted, comprises, as does the nozzle in EP-A-0182,545, a conduit for supply of the paste fuel. The conduit of the invention tapers towards the outlet of the nozzle in the proximity thereof, and a spout for supply of splitting air which is located centrally of the conduit extends towards the outlet of the nozzle, the opening of said spout being located upstream of the outlet of the nozzle. Such a nozzle is of a simpler construction than the nozzles now used above all because no expensive cone of ceramic material is required, which is consumed and must be replaced now and then, and because it is not necessary for the nozzle to have a slot for a flow of secondary splitting air.

BRIEF DESCRIPTION OF THE DRAWINGS

In order to explain the invention in more detail, reference is made to the accompanying drawings in which.

DETAILED DESCRIPTION OF THE INVENTION

Figure 1:
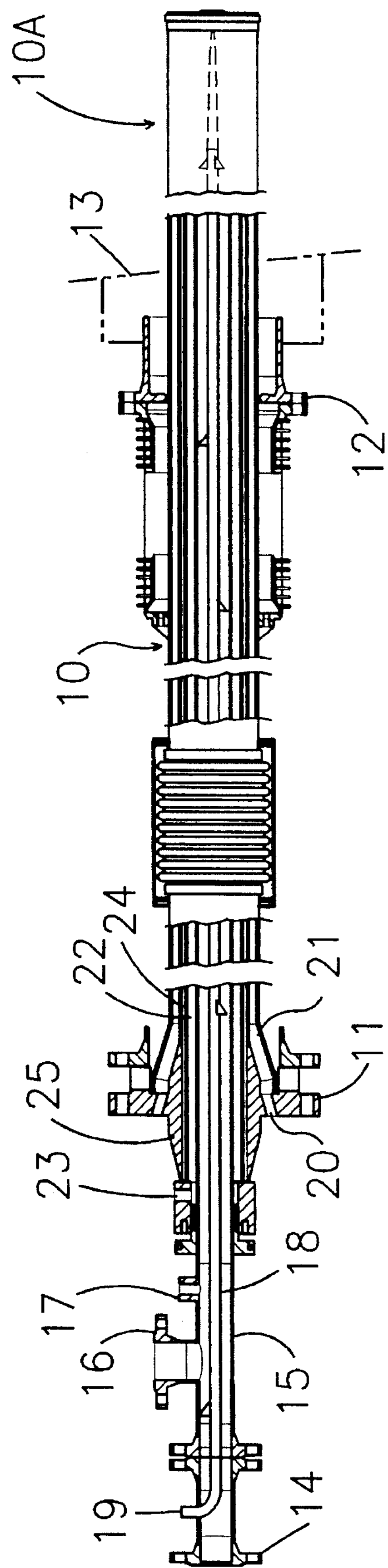
FIG. 1 is an axial cross sectional view of a nozzle for supply of paste fuel to a fluidized bed.

FIG. 1 shows a fuel nozzle 10, provided with a flange 11 for attachment to the pressure vessel of a PFBC plant, and a flange 12 for attachment to the wall of the combustion chamber with the outlet portion 10A of the nozzle projecting into a fluidized bed of a bed container box indicated by dot-and-dash lines 13. A connection 14 of a conduit 15 for supply of paste fuel is provided at the outer end of the nozzle, and a socket 16 for a pressure sensor as well as a socket 17 for a temperature sensor are provided on said conduit. A conduit 18 for supply of primary splitting air is mounted co-axially inside the conduit 15 centered by means of suitable spacers, and this conduit has a connection socket 19 extended laterally from the conduit 15. An inlet 20 for secondary splitting air is provided in the flange 11 and communicates with a conduit 21 mounted as an outside jacket on the nozzle. A jacket 22 for incoming cooling water is provided around the conduit 15, said jacket communicating with a connection 23, and outside the jacket 22 a jacket 24 for outgoing cooling water is provided between said jacket 22 and jacket 21 for the secondary splitting air, the jacket 24 communicating with a conduit 25.

Figure 2:
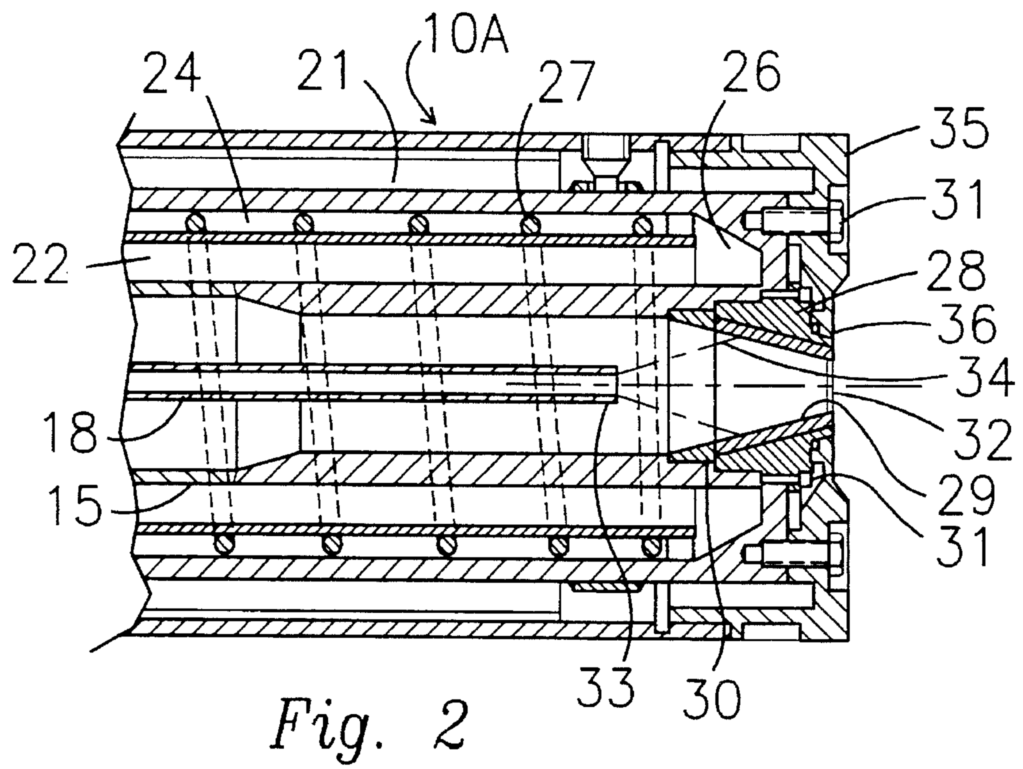
FIG. 2 is an enlarged axial cross sectional view of an outlet portion of a prior art nozzle.

Referring to FIG. 2 which discloses the outlet portion 10A of the prior art nozzle it will be seen that the cooling jackets 22 and 24 communicate with each other at 26 in the front end of the outlet portion and that a helical guide rail 27 is provided in the jacket 24 for the outgoing cooling water to impart a rotational movement to the outgoing cooling water. A cone socket 28 with an inside wear cone 29 of ceramic material forms the outlet of the nozzle, and said cone socket is clamped against a cone ring 30 by means of screws 31 mounting the cone socket. Thus, the wear cone 29 forms an end wall in the conduit 15 for paste fuel, said end wall tapering towards the outlet 32 of the nozzle, and the conduit 18 for the primary splitting air forms a spout 33 directed towards the outlet, which supplies a solid conical air jet indicated by dot-and-dash lines 34, said jet hitting the wear cone 29. The primary splitting air is supplemented by a secondary splitting air supplied through an annular slot 36 at the nozzle outlet 32 said slot being defined between the cone socket 28 and a support flange 35 mounted by means of screws 31'. The annular slot communicates with the jacket 21 for the supply of the secondary splitting air which is directed towards the axis of the nozzle outlet from the annular slot.

Figure 3:
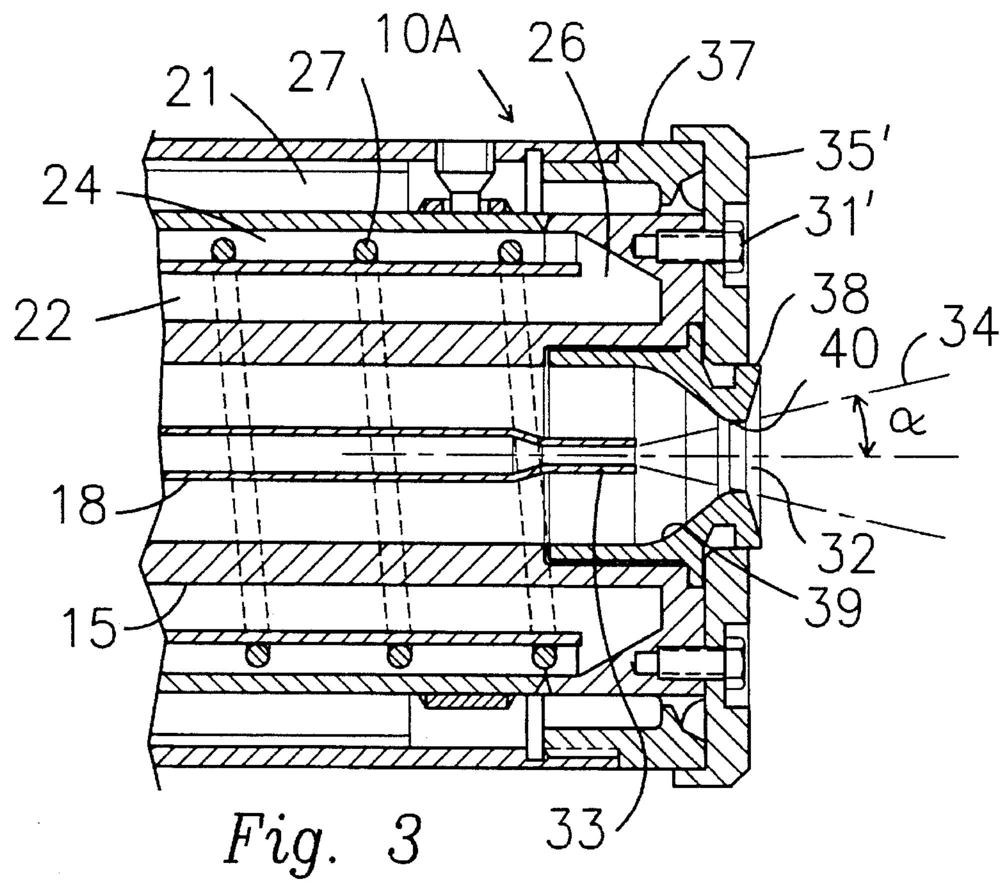
FIG. 3 is an enlarged axial cross sectional view of the outlet portion of the nozzle of the invention in an embodiment which is a re-construction of the nozzle according to FIG. 2.

The drawbacks of said prior art nozzle have been accounted for above, and according to the invention these drawbacks shall be overcome by the nozzle being constructed as shown in FIG. 3, which is a reconstructed version of the nozzle of FIG. 2.

According to FIG. 3, the support flange is modified and therefore designated 35' in this figure. The support flange in this case does not define an annular slot for secondary splitting air and, therefore, the jacket 21 is closed in the outlet end of the nozzle by means of a sealing ring 37 mounted by means of the support flange. No secondary splitting air should be supplied when the method of the invention is practiced. A nozzle insert 38 which has an inside surface 39 tapering at about forty-five degrees towards the nozzle outlet is mounted by means of the support flange, said surface forming an end wall in the conduit 15 and passes into a short cylindrical passage 40 forming the nozzle outlet 32. The spout 33 in this case is made narrower than in FIG. 2 and is extended towards the nozzle outlet 32. It is constructed such that it supplies the splitting air as a solid cone including an angle alpha with the axis, which preferably ranges from fourteen to fifteen degrees. The splitting air cone is brought to form a tangent to the nozzle insert 38 in the outlet 32 and, therefore, creates a low erosion pressure. Due to the high relative speed of the splitting air any tendency of agglomerates being formed by the particles developed by the paste fuel being comminuted, will be eliminated, and for that reason no supplementing secondary splitting air is required. Moreover, there is obtained a narrow droplet size distribution. The splitting air not only splits the fuel but also launches the fuel into the bed. The air cuts the paste fuel at the outlet and, therefore, trickling of the fuel will be reduced or prevented. If there is from the beginning a difference between the axes of the nozzle insert and the air spout, there will be created a compensation for such discrepancy by the erosion caused by the splitting air on the nozzle insert so that there will be obtained after an initial operation period optimal adjustment of the nozzle outlet 32 of the nozzle insert to the outflowing air cone. It will also be seen from FIG. 3 that the nozzle insert 38 is extended axially into the conduit 15 to be surrounded to a substantial portion thereof by the cooling jacket 22 so that the nozzle insert will be cooled which has been found to eliminate the risk of sintered material adhering to the nozzle insert.

In the embodiment according to FIG. 3 no ceramic wear cone is required. The nozzle insert 38 can be made of heat resistant stainless steel. It will be exposed to certain wear by erosion caused by the air cone 34 but this wear is of such magnitude that during normal operational conditions it can be expected that the nozzle insert has to be replaced at a frequency of the order, once a year.

Figure 4:
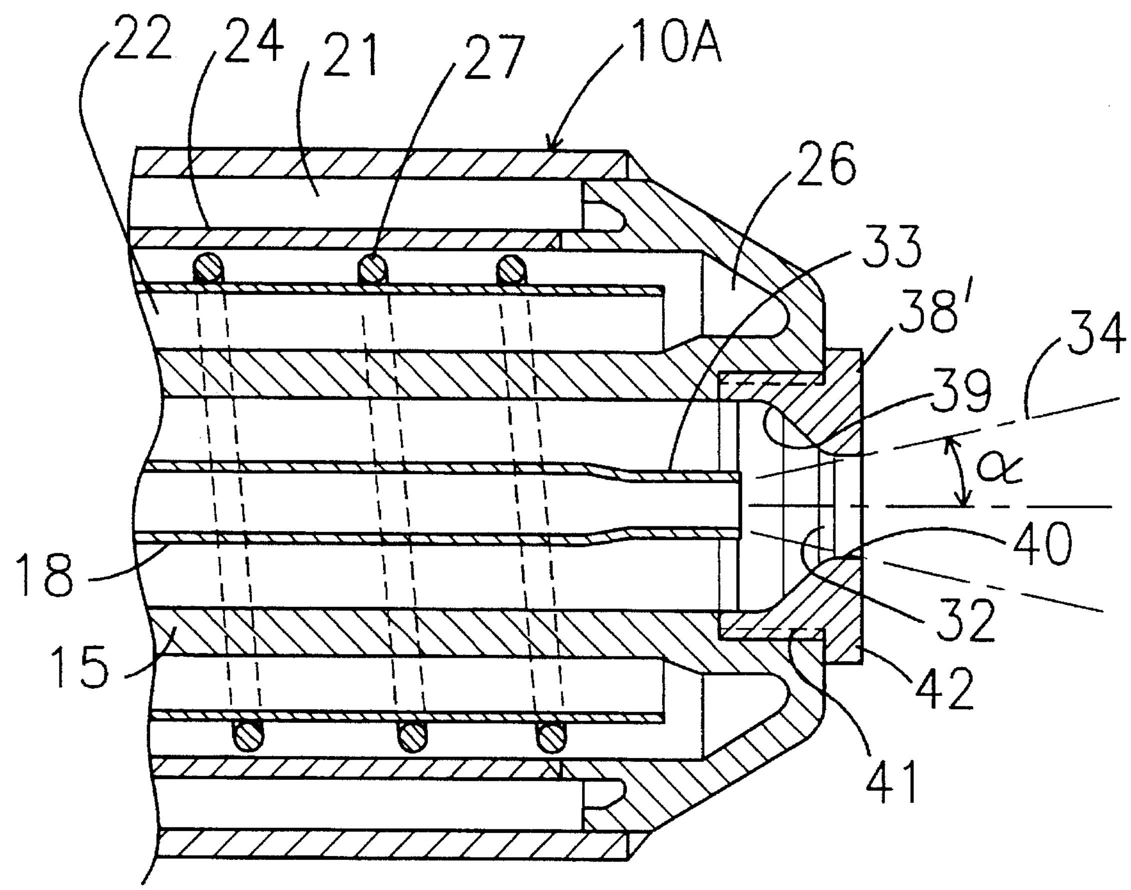
FIG. 4 is an axial cross sectional view of another embodiment of the nozzle of the invention.

The nozzle in FIG. 3 is of a sturdy construction but it can be further simplified if it is designed from the beginning for practicing the method of the invention. A nozzle of this type is shown in FIG. 4. In the embodiment according to FIG. 4 there is obtained an improved geometry and an improved cooling of the nozzle insert which in this embodiment is designated 38'. The nozzle insert is screwed by means of threads 41 into the forward portion of the nozzle, adapted to the insert, and abuts the forward end surface of the nozzle at a flange 42. Thus, no support flange attached by means of screws is required in this case. The jacket 21 remains but is not needed for the supply of secondary splitting air and can be dispensed with in order to further simplify the nozzle. The cooling water cavity 26 interconnecting the two cooling jackets 22 and 24 in the front end of the nozzle surrounds a major portion of the nozzle insert 38' which as a consequence thereof will be effectively cooled, the risk of adhesion of material to the nozzle insert being eliminated as a consequence thereof. No screw connections in addition to the screw connection between the nozzle and the nozzle insert are provided, which means that the costs can be reduced significantly. The constructive embodiment is obviously simpler as will be seen by a comparison with the embodiments of FIGS. 2 and 3. However, it is within the scope of the invention to mount the nozzle insert by means of screws, e.g. screws which pass through the flange 42, and to mount the nozzle insert in another way than that described herein.

Having thus described the invention, what is claimed and desired to be secured by Letters Patent is:

1. A method for comminuting paste fuel supplied from a nozzle to a fluidized bed, wherein the fuel in the nozzle is pressed against an annular end surface tapering towards a nozzle outlet, and is distributed by means of a jet of splitting air ejected from the nozzle centrally of the fuel flow, upstream of the nozzle outlet, comprising the additional step of imparting the shape of a cone to the jet of splitting air in the absence of a cone shaped deflection cone at the nozzle outlet, with an outer edge of the cone of splitting air being tangent to an inner edge of the nozzle outlet.

2. The method according to claim 1 wherein the outer edge of the cone is formed at an angle of fourteen to fifteen degrees with a central longitudinal axis of the nozzle.

3. The method according to claim 2 wherein the jet of splitting air flow is changed to change a droplet size distribution to the comminuted fuel.

4. The method according to claim 1 wherein the jet of splitting air flow is changed to change a droplet size distribution of the comminuted fuel.

5. A nozzle assembly for supplying a paste fuel to a fluidized bed, the paste fuel being comminuted, the nozzle assembly comprising a conduit for supplying the paste fuel, the conduit tapering at an end proximal to an outlet of a nozzle, a spout for supplying splitting air located centrally to the conduit and extending towards the outlet of the nozzle, an opening of the spout located upstream from the outlet of the nozzle, the opening of the spout constructed to impart a shape of a cone to the splitting air delivered therefrom without the presence of a deflecting cone, an outer edge of the cone of splitting air being tangent to an inner edge of the outlet of the nozzle.

6. The nozzle assembly according to claim 5 wherein the spout is constructed to impart to the cone of splitting air an angle of about fifteen degrees between the outer edge of the cone of splitting air and a central longitudinal axis of the nozzle.

7. The nozzle assembly according to claim 5 wherein the tapering end of the conduit for supplying paste fuel passes into a cylindrical passage forming the outlet of the nozzle.

8. The nozzle assembly according to claim 7 wherein the tapering end of the conduit for supplying paste fuel and the cylindrical passage are mounted in a separate nozzle insert within the nozzle assembly.

* * * * *